US006823176B2

(12) United States Patent
Rogers

(10) Patent No.: US 6,823,176 B2
(45) Date of Patent: Nov. 23, 2004

(54) AUDIO ARTIFACT NOISE MASKING

(75) Inventor: Terrence E. Rogers, Durham, NC (US)

(73) Assignee: Sony Ericsson Mobile Communications AB (SE)

(*) Notice: Subject to any disclaimer, the term of this patent is extended or adjusted under 35 U.S.C. 154(b) by 103 days.

(21) Appl. No.: 10/065,158

(22) Filed: Sep. 23, 2002

(65) Prior Publication Data

US 2004/0203454 A1 Oct. 14, 2004

(51) Int. Cl.$^7$ .............................. H04B 17/00
(52) U.S. Cl. .................. 455/67.13; 381/73.1; 704/228
(58) Field of Search ................. 704/228, 226; 455/67.13, 63.1, 67.11, 550.1, 283, 284, 296, 310, 317; 381/73.1

(56) References Cited

U.S. PATENT DOCUMENTS

| | | | | | |
|---|---|---|---|---|---|
| 5,301,363 | A | * | 4/1994 | Hinderks | 455/101 |
| 5,428,832 | A | * | 6/1995 | Nohara et al. | 455/296 |
| 5,794,188 | A | * | 8/1998 | Hollier | 704/228 |
| 5,872,852 | A | * | 2/1999 | Dougherty | 381/57 |
| 5,893,056 | A | * | 4/1999 | Saikaly et al. | 704/226 |
| 6,075,324 | A | * | 6/2000 | Matsumoto | 315/169.3 |
| 6,263,216 | B1 | * | 7/2001 | Seydoux et al. | 455/564 |
| 6,647,367 | B2 | * | 11/2003 | McArthur et al. | 704/226 |
| 2003/0064746 | A1 | * | 4/2003 | Rader et al. | 455/550 |
| 2003/0223597 | A1 | * | 12/2003 | Puria et al. | 381/104 |

FOREIGN PATENT DOCUMENTS

| | | | |
|---|---|---|---|
| DE | 100 56 498 | 5/2002 | |
| GB | 2284970 A | * 6/1995 | H04B/1/10 |
| GB | 2338859 | 12/1999 | |

OTHER PUBLICATIONS

Patent Abstracts of Japan, vol. 1998, No. 09 (Jul. 31, 1998), JP 10 111699, A. Matsushita Eleectric Ind. Co., Ltd.

* cited by examiner

Primary Examiner—Lee Nguyen
Assistant Examiner—Lewis G. West
(74) Attorney, Agent, or Firm—Moore & Van Allen PLLC; Gregory A. Stephens

(57) ABSTRACT

A system and method of masking an objectionable artifact in a mobile telephone. The process starts by referring to the design characteristics of the mobile phone to determine the expected level and source of objectionable artifacts that will be apparent during operation of the mobile phone. The noise necessary to mask the objectionable artifact is then calculated. The masking noise signal is then created within the mobile telephone and superimposed over the objectionable artifact. The masking noise signal is typically created in a digital signal processor (DSP) resident within the mobile telephone using a pseudo-noise generator. The masking noise signal can be stored as a look-up table in the digital signal processor (DSP) of the mobile telephone. To further enhance the effectiveness of the masking process, the masking noise signal is filtered to best match the objectionable artifact. The masking noise signal can be low pass filtered for objectionable artifacts that are lower in frequency. The masking noise signal can be high pass filtered for objectionable artifacts that are higher in frequency. Or, the masking noise signal can be band pass filtered for objectionable artifacts regardless of frequency. In an alternative embodiment, the masking noise signal can be created as a band-limited masking noise signal created within a predetermined frequency bandwidth correlated to the frequency bandwidth of the objectionable artifact.

30 Claims, 7 Drawing Sheets

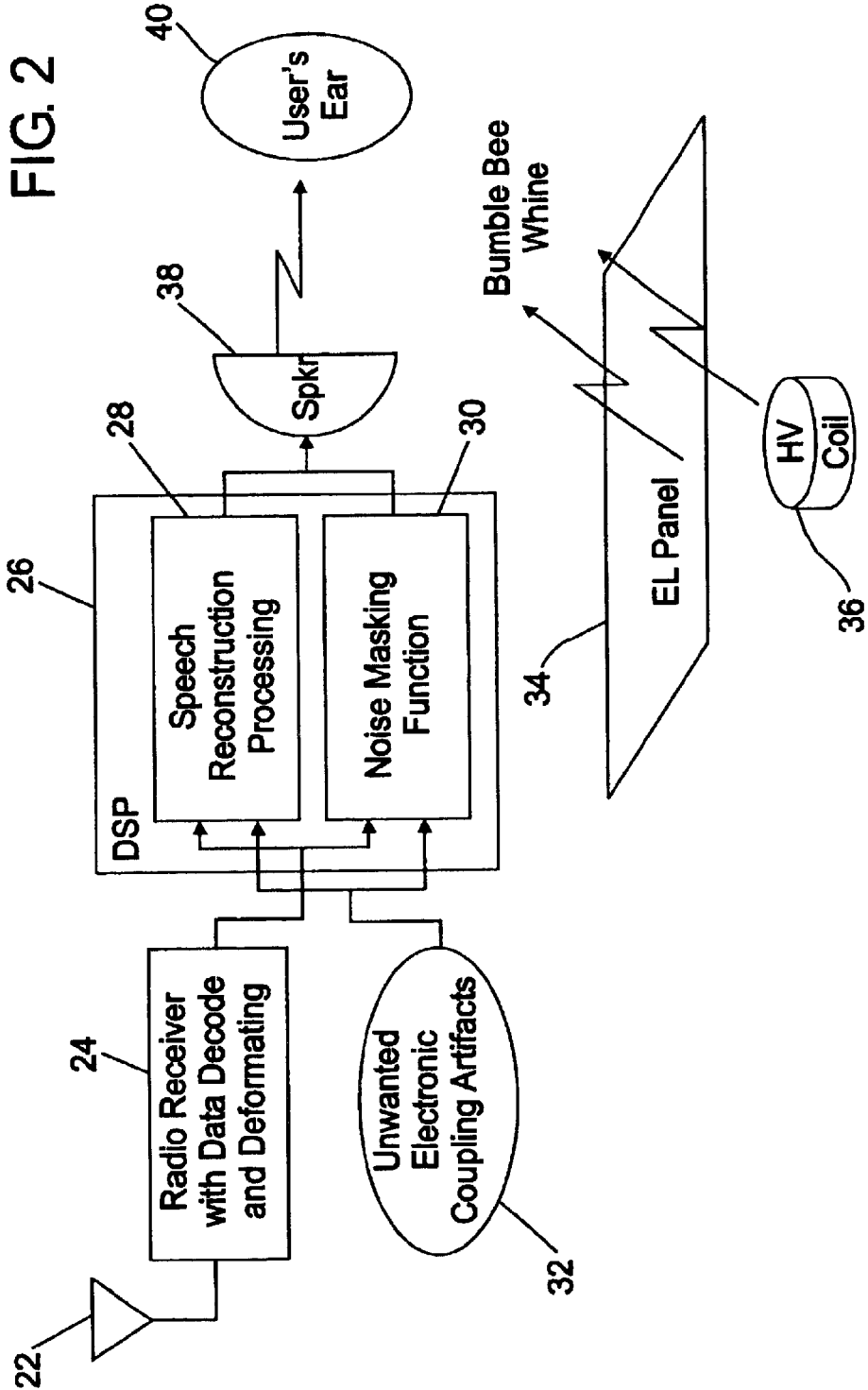

AUDIO ARTIFACT NOISE MASKING

BACKGROUND OF INVENTION

A mobile phone is susceptible to minor but objectionable audio artifacts emanating from components within the mobile phone that are not part of the mobile phone's audio system. One example of an objectionable audio artifact emanates from the electro-luminescent (EL) panel used for back-lighting a mobile phone's display. Another example involves certain pulses generated by TDMA type RF communications devices. These artifacts can be particularly irritating even at low levels. Improved design practice can reduce but not eliminate these objectionable artifacts which typically sound like bees trapped inside the mobile phone.

Previously, there was no way to solve the objectionable artifact problem without increasing the sophistication of the mobile phone's mechanical and/or acoustic design. Design solutions of this nature are achieved at increased cost, a longer product development cycle, and often result in decreased performance. Moreover, it is difficult to change the mechanical characteristics of a mobile phone but relatively easy to alter a few lines of digital signal processor (DSP) software code to generate a masking noise capable of counteracting the objectionable artifact.

What is needed is a method of masking objectionable artifacts in mobile phones without having to increase the sophistication of the mobile phone design.

SUMMARY OF INVENTION

Rather than attempting to eliminate objectionable artifacts in mobile phones completely, the present invention masks the objectionable artifacts with an appropriately constructed low level masking noise so that the objectionable artifacts are not detectable by the user of the mobile phone. It is often impractical to use the DSP to remove the artifact(s) because the DSP cannot obtain a sample of the artifact without a significant cost increase.

The present invention is a system and method of masking objectionable artifacts in a mobile telephone. The process starts by referring to the design characteristics of the mobile phone to determine the expected level and source of objectionable artifacts that will be apparent during operation of the mobile phone. The noise necessary to mask the objectionable artifacts is then calculated. The masking noise signal is then created within the mobile telephone and superimposed over the objectionable artifact.

The masking noise signal is typically created in a digital signal processor (DSP) resident within the mobile telephone using a pseudo-noise generator. The masking noise signal can be stored as a look-up table in the digital signal processor (DSP) of the mobile telephone.

To further enhance the effectiveness of the masking process, the masking noise signal is filtered to best match the objectionable artifact. The masking noise signal can be low pass filtered for objectionable artifacts that are lower in frequency. The masking noise signal can be high pass filtered for objectionable artifacts that are higher in frequency. Or, the masking noise signal can be band pass filtered for objectionable artifacts regardless of frequency.

In an alternative embodiment, the masking noise signal can be created as a band-limited masking noise signal within a pre-determined frequency bandwidth correlated to the frequency bandwidth of the objectionable artifact. In this embodiment, the noise masking signal has been pre-filtered and need not be filtered after it has been created.

BRIEF DESCRIPTION OF DRAWINGS

FIG. 2 is a block diagram illustrating functional components of the present invention.

DETAILED DESCRIPTION

Figure 1:
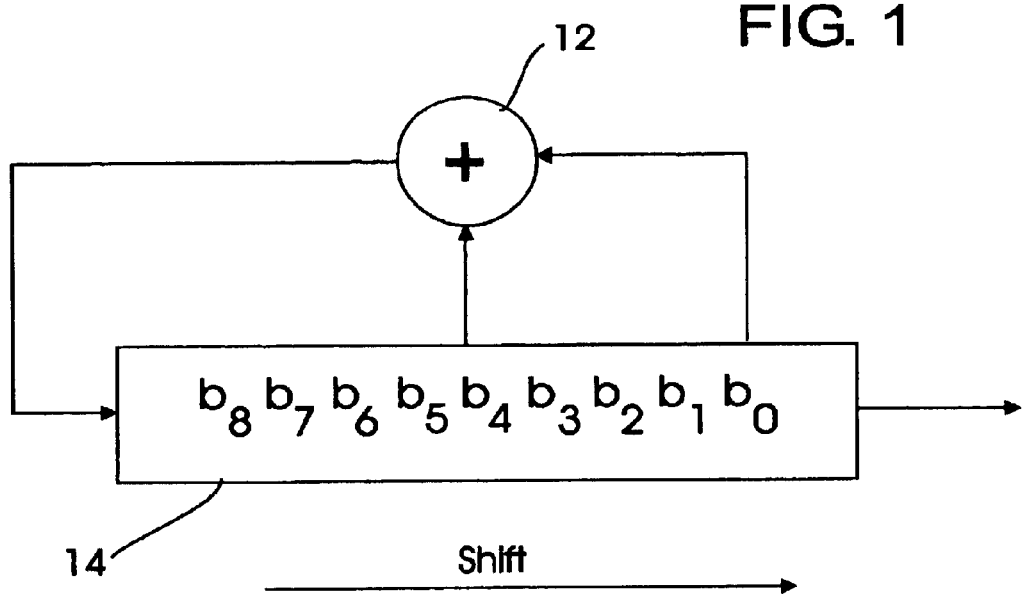
FIG. 1 is an illustration of a pseudo-noise generator shift register.

It has been shown that effective masking of an unwanted artifact can be accomplished via superposition of a noise masking signal having a power density per 100 Hz that is comparable to the artifact power if the noise masking signal bandwidth is centered at or slightly lower than the original artifact frequency. The bandwidth for the noise masking signal should be 15% to 20% about the center frequency of the original artifact. This bandwidth can be effectively reduced to as little as 10% for mobile phone noise masking applications.

The present invention is typically implemented by means of software, preferably in a digital signal processor (DSP), which is already present in the mobile phone. The DSP is used for audio processing in both the transmit and receive paths of a mobile phone. A DSP software implementation achieves the goal of masking objectionable artifact without having to alter the physical or electrical design of the mobile phone.

The present invention describes two methods of implementing an appropriately constructed masking noise over an objectionable artifact in a mobile phone. The first method involves filtering artificially generated white or pink noise. The second method involves generating a masking noise signal already within a targeted bandwidth. In addition, a slightly modified version of the latter method can be integrated into the mobile phone hardware by modifying the EL panel oscillator drive signal.

For purposes of the present invention, a masking noise is defined as a signal such that its correlation with any other signal is zero. Such a signal is commonly referred to as white noise. Humans, like any other system, have a finite bandwidth in which we can hear. Thus, the above masking noise definition may be relaxed so that the auto-correlation is very small for time delays that are greater than 1/bandwidth (approximately 1/15 kHz=67 μsec.). Such a band limited masking noise signal is referred to as pink noise. A further relaxation of the masking noise definition exists for systems (including humans) having limited memory or inaccurate timing at some delay. Therefore, the masking noise signal may be relaxed so that the auto-correlation is very small for time delays that are greater than 1/bandwidth (approximately 4 kHz=250 μsec). The masking noise signal will be interpreted as noise-like as long as there is a low correlation (less than 3%) for any period shorter than 50 msec.

The relaxed masking noise definition makes it is possible to use a pseudo-noise generator to generate the masking noise(s) used by the present invention. This is advantageous since pseudo-noise generators are commonly deployed in mobile phones as test devices.

Two typical pseudo-noise generating models are termed pseudo-noise 9 (pn9) and pseudo-noise 13 (pn13) generators. The pn9 generator can be described as a 9 bit shift register having feedback that satisfies a polynomial such as $(X^0+X^4)$. There are, however, other well known polynomials that can be substituted without affecting the present invention.

FIG. 1 illustrates a pn9 shift register that can be used to generate a masking noise. Initially, the register must not contain all 0s. Any other initial value will do, however. The '+' operator 10 is an exclusive-or (XOR) function. The register 12, driven by clock pulses (not shown), will take on every value from 1 to 511 ($2^9-1$) in a random fashion with an auto-correlation of not greater than |1| except at time delay=0, where the auto-correlation is 511. Thus, the pn9 shift register 12 is noise-like. After the pn9 shift register 12 cycles through the aforementioned values, it repeats.

The register contents may be considered to be the value of an audio sample at 8 ksps (kilo samples per second), a typical mobile phone audio sample rate, and applied to a digital-to-analog converter followed by a below 4 kHz low pass filter. The result is a sound not unlike that of rain, waves at the seashore, or a waterfall.

Pn9 pseudo-noise run at 8 ksps has a barely discernable buzz with a repetition rate of approximately 64 msec, which is marginal with respect to the 50 msec threshold. Pn13 generators repeat every 1.02 seconds at 8 ksps and are indistinguishable by humans from ideal pink noise. Since DSPs typically employ 16 bit arithmetic, they can use a pn15 generator without any additional load. A pn9 generator is small enough, however, that it can be economically implemented as a look-up table for software implementations. This is sufficient since the objectionable artifacts involved are low level. For a hardware implementation as a shift register and feedback as shown in FIG. 1, there is very little cost for implementing a pn9, pn13, pn15, or even pn(>15). Therefore, a pn13 pseudo-noise generator or greater would be used rather than a pn9 pseudo-noise generator due to a lower correlation value.

If, however, a pseudo-noise generator is used in which the register values represent the instant value of an amplitude scaled noise signal, it is possible to filter the masking noise digitally with either a band pass or combination high and low pass filter to create the most desired spectrum for the masking noise.

Some typical sources of objectionable artifacts include interference from an EL panel used to back-light the mobile phone's display and the HV coil used to supply higher voltages required for the EL panel. Objectionable artifacts may also appear in the transmit path of GSM and/or TDMA mobile phones where the pulse rate is in the audio frequency band with harmonics at multiples thereof. Objectionable artifacts can also get in through power supply and RF envelope detection coupling. In such cases, the objectionable artifacts are present in the audio being input to the DSP for encoding. Thus, the masking noise is added before encoding and when the transmitter is at maximum power.

Objectionable artifacts can be detected during the design stage of the mobile phone. Moreover, the objectionable artifacts remain relatively constant. Thus, if we can determine the expected objectionable artifacts that will be present during normal mobile phone operations, we can pre-calculate the requisite masking noise necessary to mask the objectionable artifacts. The mobile phone's DSP can be subsequently programmed to introduce the proper bandwidth masking noise at the appropriate times during mobile phone use.

FIG. 2 illustrates a block diagram-of some of the functional components of a mobile phone implementing the present invention. An antenna 22 feeds an RF signal to a radio receiver 24. The radio receiver 24 decodes and de-formats the incoming signal and forwards it to a DSP 26. The DSP 26 includes a speech reconstruction component 28 and a noise masking component 30. Each of these components receives an identical input from the radio receiver 24. The DSP 26 may also receive unwanted electronic coupling artifacts 32 emanating from various electronic coupling mechanisms such as ground loops, power supply coupling, etc. Other sources of objectionable artifacts emanating from within the mobile phone (but not input to the DSP) may include EL panel 34 interference or HV coil 36 interference. These objectionable artifacts have been previously calculated during the design stage and are considered to be known. Thus, even though the DSP 26 does not receive these signals directly, it can still perform noise masking on them because they are expected sources of objectionable artifacts.

The DSP 26 performs its normal speech reconstruction processing 28 and outputs a resulting audio signal via the mobile phone's speaker 38. The DSP 26 also performs noise masking on the expected objectionable artifacts. This results in a noise masking signal that can be superimposed over the speech reconstruction signal. The speaker output will now effectively mask any objectionable audio artifacts rendering them inaudible to the user of the mobile phone.

If the objectionable artifact source emanates from an EL panel, then masking noise is added when the EL panel is powered up and fades to zero shortly after EL panel power is removed. A fade over several seconds is necessary lest the masking noise itself be made more apparent due to its sudden removal.

Figure 3:
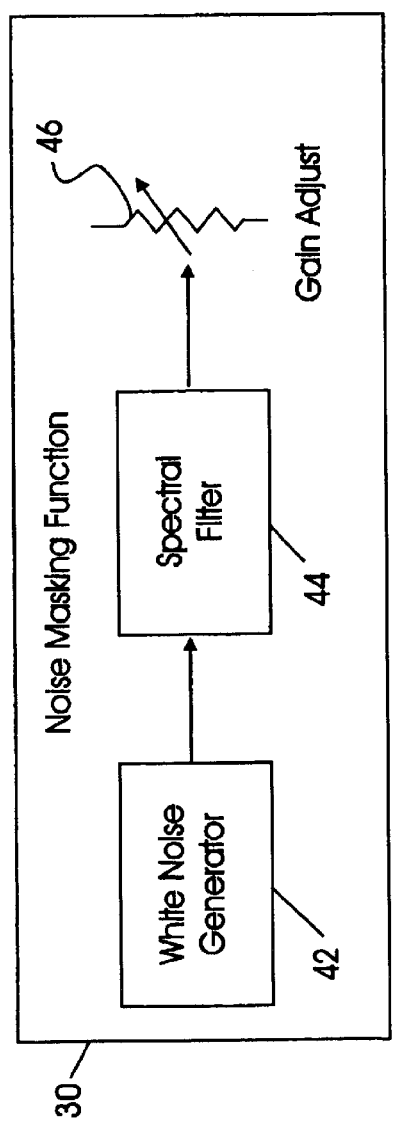
FIG. 3 is a block diagram of the noise making function within the digital signal processor (DSP) of FIG. 1

There is a preferred method for introducing the masking noise in the least noticeable way, a good thing as we are trying to make artifacts less notable. As noted above, the masking effect is achieved by noise which is spectrally proximal to the objectionable artifact, preferably centered at the artifact frequency or slightly below. Therefore, the noise masking function 30 in FIG. 2 can be further resolved as shown in FIG. 3.

The noise masking function 30 includes a white noise generator 42 that generates noise at a level needed to mask the objectionable artifact. The white noise generator 42 can be a pseudo-noise generator like those previously discussed. The white noise is then passed to a spectral filter 44 so that it can be specifically applied to the frequency and bandwidth of the objectionable artifact. The filtered noise signal is then gain adjusted 46 to provide the best masking effect for the objectionable artifact. The spectral filter 44 can be a band pass filter on the order of 100 Hz, a low pass filter, a high pass filter, or a flat transfer. Phase distortion and group delay do not affect the user's perception of noise. A band pass filter provides the best noise masking results followed by either a low pass or high pass filter (depending on the frequency and bandwidth of the artifact being masked) or a flat transfer.

Figure 4:
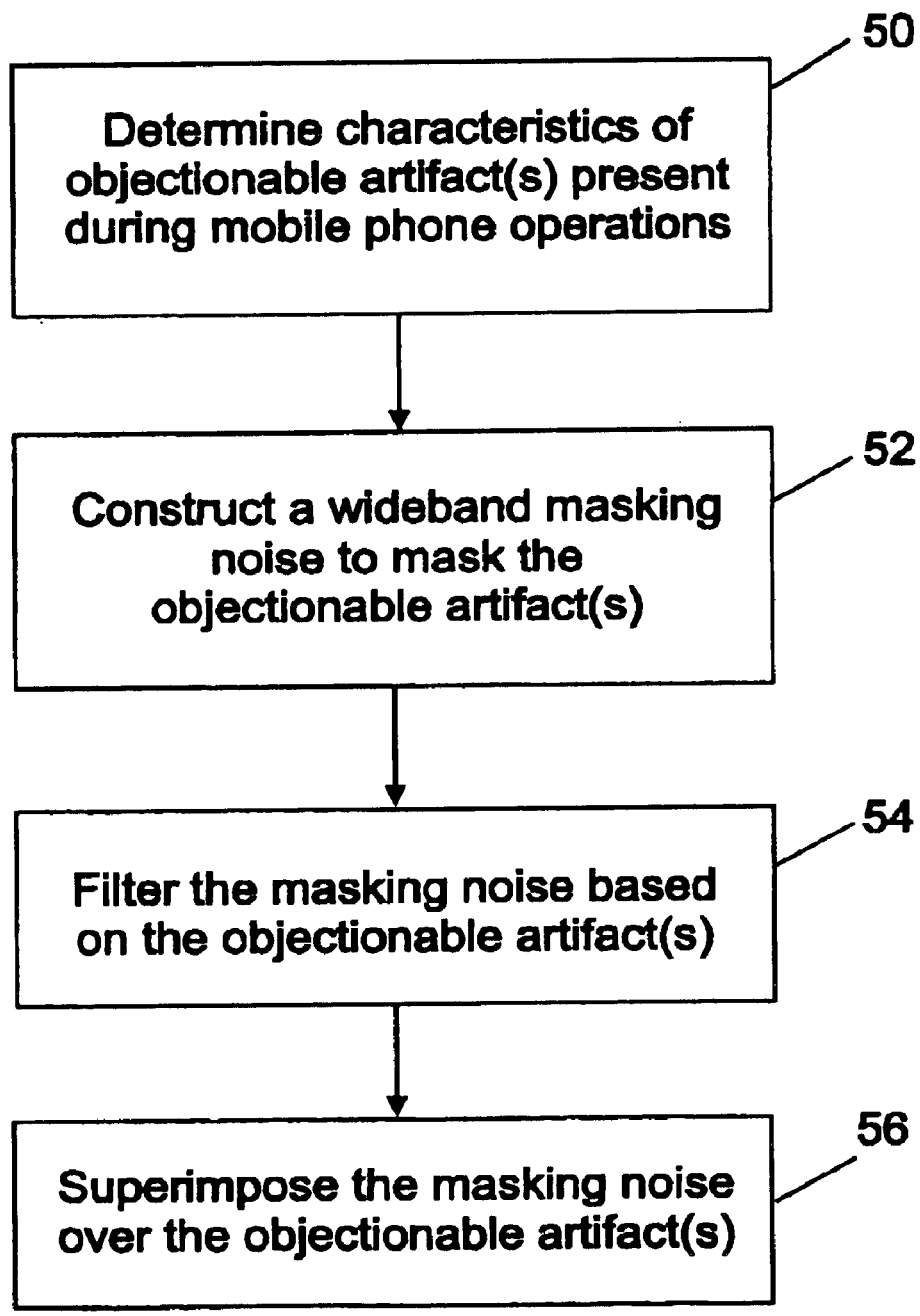
FIG. 4 illustrates one example of a flowchart for masking an objectionable artifact that can be perceived by a user of a mobile telephone.

FIG. 4 is a flowchart describing a process of masking an objectionable artifact in a mobile phone wherein noise is added then filtered. The process actually begins in the design stage of the mobile phone. At this point the characteristics of the electronic components that will be included in the mobile phone as well as their physical orientation are input to computer models. The computer models can calculate the expected objectionable artifact(s) that will be present during mobile phone operation 50. The calculations would provide characteristics of the objectionable noise(s) such as, but not limited to, the frequency, bandwidth and approximate intensity of the unwanted artifact(s). Once known, a wide band masking noise can be constructed 52 in the DSP. The wide band masking noise can be constructed in a number of ways including using a pseudo-noise generator. In addition, depending on DSP throughput characteristics and the desired level of effectiveness for the masking process, the wide band noise signal can be stored as a look-up table on the DSP. The wide band masking noise is then filtered 54 to mask the objectionable artifact as much as possible. Filtering involves manipulating the wideband masking noise into a waveform that is best suited in intensity, frequency, and bandwidth to mask the objectionable artifact. Once the filtered masking noise has been created, the DSP will superimpose the masking noise signal over the objectionable artifact 56 to get the desired effect of minimizing the objectionable artifact.

Figure 5:
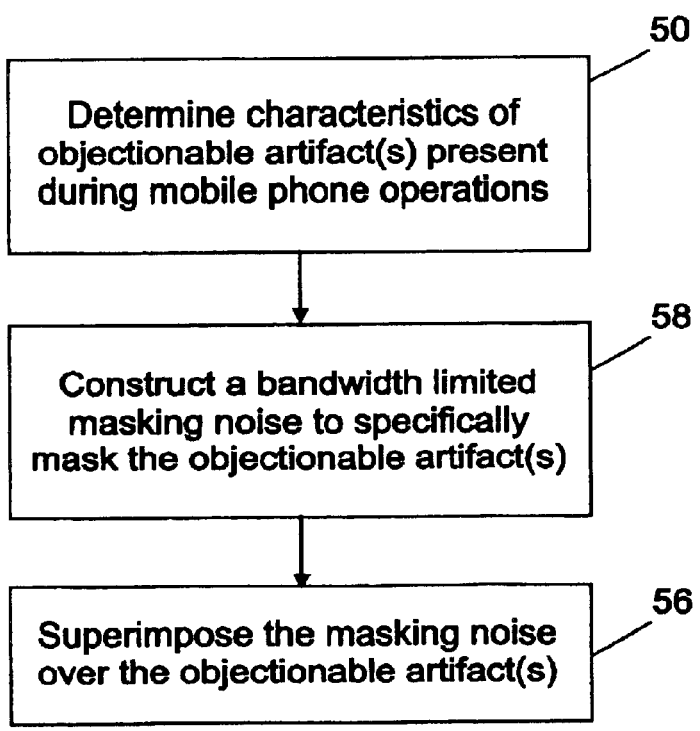
FIG. 5 illustrates another example of a flowchart for masking an objectionable artifact that can be perceived by a user of a mobile telephone.

FIG. 5 is a flowchart describing a process of masking an objectionable artifact in a mobile phone wherein masking noise is created in the DSP that is already at the requisite bandwidth. The FIG. 5 process differs from that described for FIG. 4 in that the masking noise is initially created within the noise spectrum of interest. Thus, the filtering step in FIG. 4 is not required since the masking noise signal is already matched to the objectionable artifact. The process is reduced to the steps of determining the objectionable noise characteristics 50, creating a specific bandwidth limited masking noise 58, and superimposing the bandwidth limited masking noise over the objectionable artifact 56.

Figure 6:
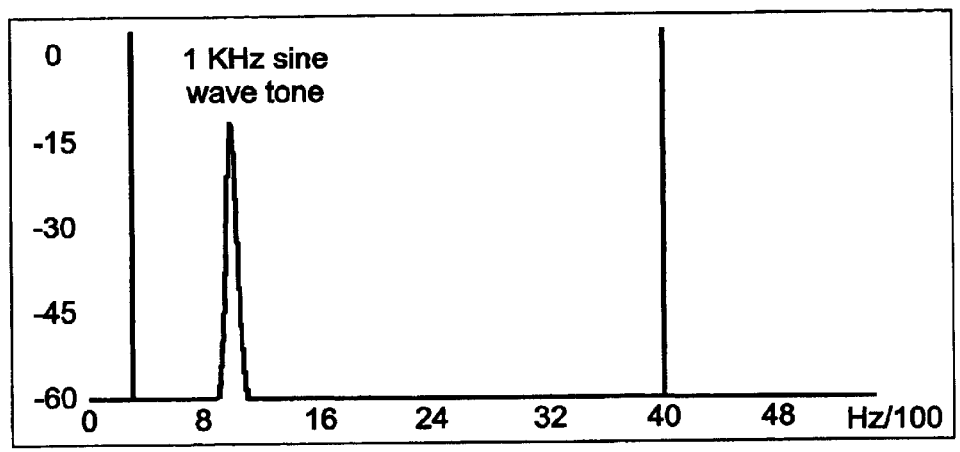
FIG. 6 illustrates a sample of objectionable artifact as a 1 KHz sine wave tone.
Figure 7:
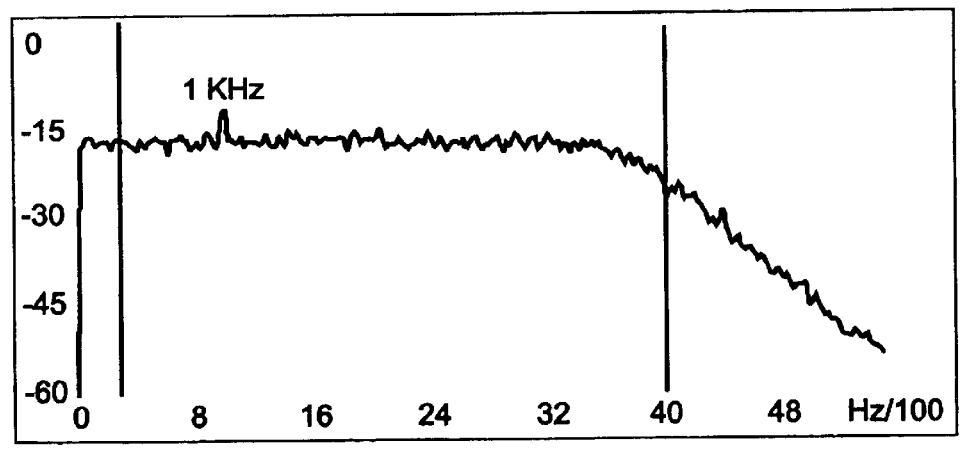
FIG. 7 illustrates the 1 KHz sine wave tone masked without additional filtering.

To better explain the present invention, an arbitrary objectionable artifact is presented to illustrate the masking process. The objectionable artifact itself is a 1 kHz sine wave as illustrated in FIG. 6. FIG. 7 illustrates the spectrum of masking noise added which is equivalent to what can be typically produced in a mobile phone. In this case, it is assumed that the Codec cannot reproduce sounds above 4 kHz so the noise is reduced above the 4 kHz point. A spectrum analyzer bandwidth is set at ~10 Hz to make the objectionable artifact stand out. If the spectrum analyzer bandwidth were ~100 Hz, the objectionable artifact would be near invisible in the graph of FIG. 7.

Figure 8:
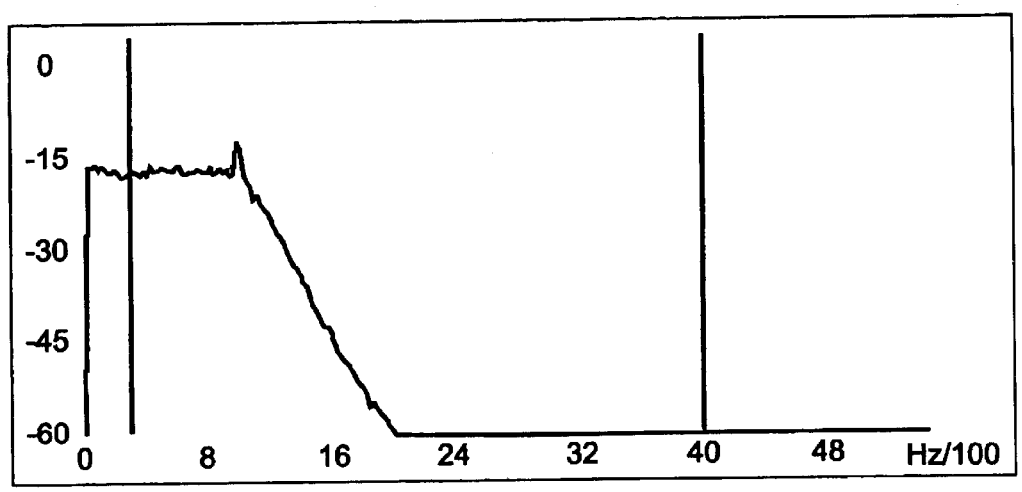
FIG. 8 illustrates the 1 KHz sine wave tone masked using wide band noise that has been low pass filtered.

For implementations that create then filter the masking noise (FIG. 4), masking noise added before filtering may sound greater than the objectionable artifact it is supposed to mask. The masking noise level can be reduced by high or low passing the masking noise, depending upon whether the objectionable artifact is relatively high or low in the relevant passband. For the 1 kHz artifact illustrated in FIG. 6, low passing the masking noise is more effective than high passing in reducing the masking noise level. This is illustrated in FIG. 8 in which a low pass filter set at approximately 1.1 kHz is shown. No noise masking signal above 1.1 kHz is permitted by the low pass filter.

Figure 9:
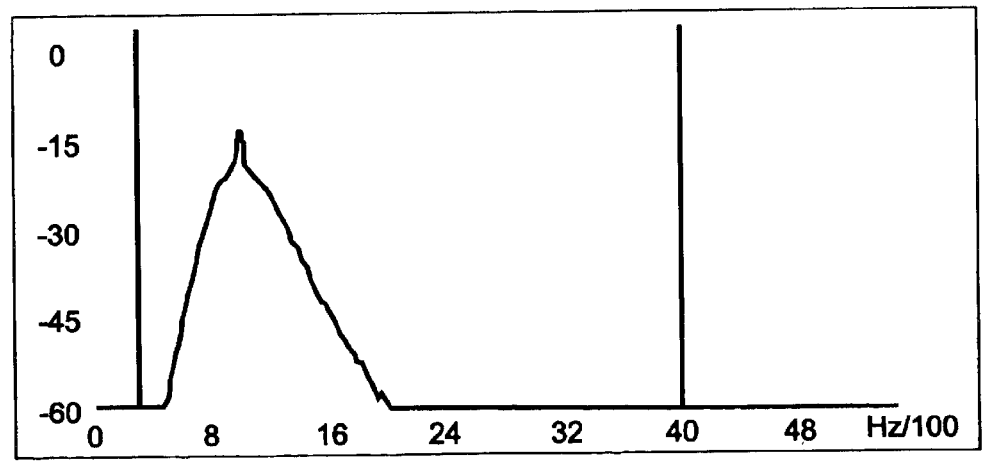
FIG. 9 illustrates the 1 KHz sine wave tone masked using wide band noise that has been band pass filtered.

FIG. 9 illustrates band pass filtering (the optimal case for this example) wherein the bandwidth of the noise masking signal is 200 Hz, centered on the 1 kHz sine wave objectionable artifact and passing an equal amount of noise energy to the 1 kHz sine wave objectionable artifact. Noise masking is just as effective with minimal added energy. Thus, the best way to mask the objectionable artifact is with a masking noise that is shaped to be concentrated at, and same power as, the objectionable artifact and 100 Hz in breadth.

Figure 10:
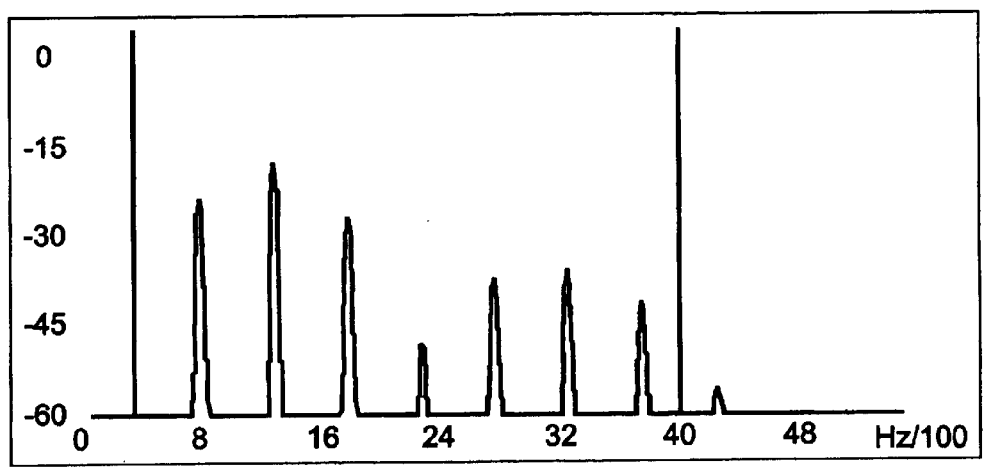
FIG. 10 illustrates a sample of objectionable artifacts including multiple harmonics.

In the case of multiple interfering artifacts, there may be several of near equal amplitude that may or may not be harmonically related. This is illustrated in the graph of FIG. 10 that mimics typical EL panel and RF induced mobile phone objectionable artifacts. In this example, only the first three artifacts at 750, 1250 and 1750 Hz would likely be heard by the user. These are all odd harmonics of a fundamental 250 Hz oscillation and characteristic of the process that produces objectionable artifacts in a typical EL panel system. Other objectionable artifact sources may have different spectrums. Producing filtered noise for each objectionable artifact would be torturous and consume much DSP power if created as previously described.

Figure 11:
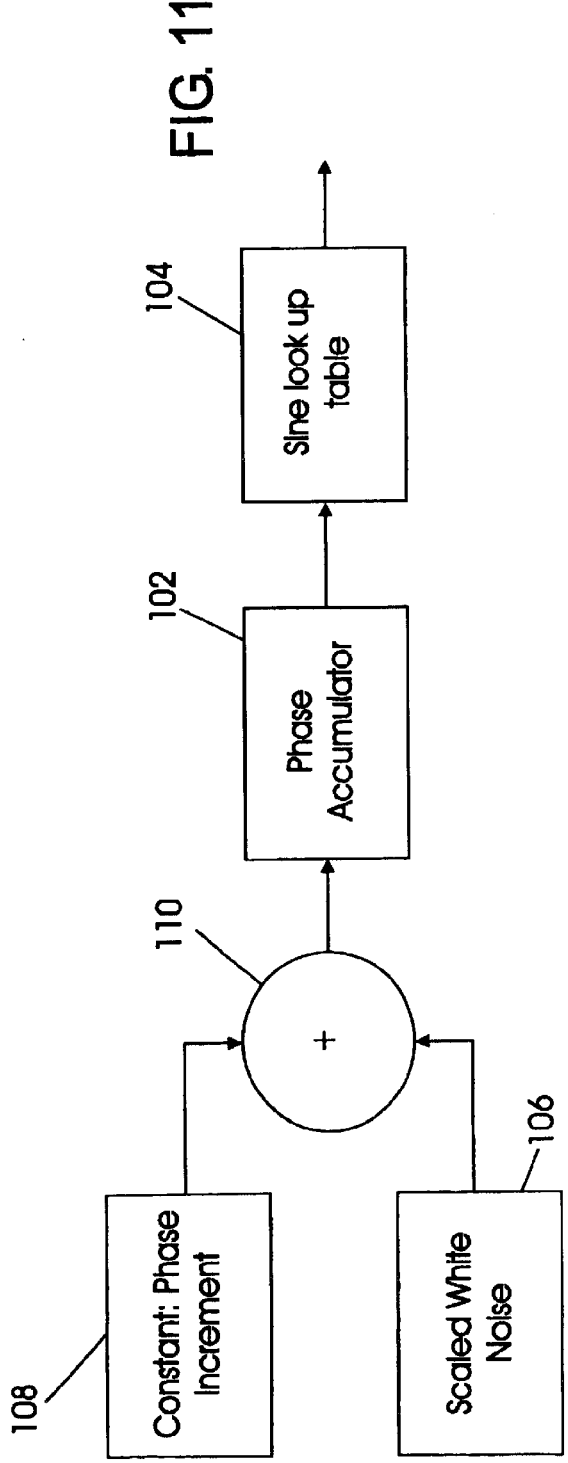
FIG. 11 is a block diagram of a numerical controlled oscillator used to generate appropriate masking noises for objectionable artifacts with multiple harmonics.

Referring to FIG. 11, one can construct a suitable band limited masking noise by creating a Numerical Controlled Oscillator (NCO) that is formed from a phase accumulator 102 and sine wave look up table 104. This is common practice in DSP systems. Alternatively, a sine wave at a given frequency may be generated via a two-stage feedback digital filter arranged so that an oscillation, once initiated, can be maintained at a constant amplitude and frequency.

Figure 12:
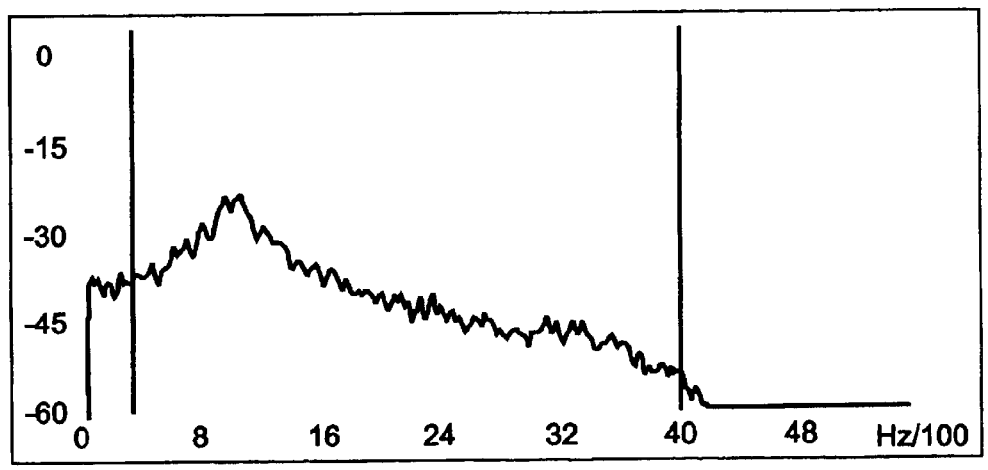
FIG. 12 illustrates a sample of objectionable artifacts including multiple harmonics that have been masked using noise generated by a numerical controlled oscillator.

The white noise generated for masking is suitably scaled 106 and added 110 to a constant phase increment 108. This becomes an input to the phase accumulator 102 resulting in a phase modulated noise having a constant amplitude. The result, as illustrated in FIG. 12, is a masking noise spectrum that appears similar to the band passed phase noise but is somewhat wider. This technique greatly reduces the required masking noise power and concentrates it where it is most required.

This technique can be used to make an ensemble of masking noise generators for each artifact. Alternatively, the sine wave table could be replaced with a compressed or even clipped version of a sine wave. Either way, harmonics of the phase noise oscillator can be generated to match that of the interfering objectionable artifacts.

This technique of masking noise generation suggests yet another technique. The EL panel oscillator (or other interferer) can be noise modulated itself. Providing the EL design permits, the oscillator providing EL panel drive circuit timing may be noise modulated in either the manner shown above or in several other self-apparent manners such that the noise masking interfering circuits produce their own phase/timing noise modulation.

While the present invention is described herein in the context of a mobile phone, the term mobile phone may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile phones may also be referred to as pervasive computing devices.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of means for is intended to evoke a means-plus-function reading of an element and a claim, whereas, any elements that do not specifically use the recitation means for, are not intended to be read as means-plus-function elements, even if the claim otherwise includes the word means.

What is claimed is:

1. A method of masking an objectionable artifact in a mobile telephone comprising:
   determining the level of the objectionable artifact present during operation of the mobile telephone;
   calculating the level of a masking noise required to mask the objectionable artifact;
   creating a masking noise signal within the mobile telephone; and
   superimposing the masking noise signal over the objectionable artifact.

2. The method of claim 1 wherein the masking noise signal is created in a digital signal processor (DSP) resident within the mobile telephone.

3. The method of claim 2 wherein the masking noise is created in the digital signal processor (DSP) of the mobile telephone using a pseudo-noise generator.

4. The method of claim 2 wherein the masking noise signal is stored as a look-up table in the digital signal processor (DSP) of the mobile telephone.

5. The method of claim 1 further comprising filtering the masking noise signal to best match the objectionable artifact.

6. The method of claim 5 wherein filtering the masking noise signal to best match the objectionable artifact comprises low pass filtering the masking noise signal for objectionable artifacts that are lower in frequency.

7. The method of claim 5 wherein filtering the masking noise signal to best match the objectionable artifact comprises high pass filtering the masking noise signal for objectionable artifacts that are higher in frequency.

8. The method of claim 5 wherein filtering the masking noise signal to best match the objectionable artifact comprises band pass filtering the masking noise signal about the center frequency of the objectionable artifact.

9. The method of claim 1 wherein the masking noise signal is a band-limited masking noise signal created within a pre-determined frequency bandwidth correlated to the frequency bandwidth of the objectionable artifact.

10. The method of claim 9 wherein the band-limited masking noise signal is created in a digital signal processor (DSP) resident within the mobile telephone.

11. The method of claim 10 wherein the band-limited masking noise signal is created in the digital signal processor (DSP) of the mobile telephone using a pseudo-noise generator.

12. The method of claim 2 wherein the band-limited masking noise signal is stored as a look-up table in the digital signal processor (DSP) of the mobile telephone.

13. The method of claim 1 further comprising fading the masking noise out over time once the objectionable artifact ceases to be present to avoid the sudden removal of the masking signal.

14. The method of claim 1 wherein the masking noise signal is generated by a numerical controlled oscillator (NCO) whose phase is noise modulated thereby producing a masking noise signal of a desired bandwidth without additional filtering.

15. The method of claim 14 wherein the NCO amplitude output is limited thereby producing a phase modulated masking noise signal having harmonics to mask harmonics of an objectionable artifact.

16. The method of claim 1 wherein the masking noise signal is generated by a repetitive pulse whose period is noise modulated and whose pulse width is adjusted to a constant duty cycle such that harmonics have the desired amplitude to mask harmonics of the objectionable artifact.

17. A system for masking an objectionable artifact in a mobile telephone comprising:
   means for determining the level of the objectionable artifact present during operation of the mobile telephone;
   means for calculating the level of a masking noise required to mask the objectionable artifact;
   means for creating a masking noise signal within the mobile telephone; and
   means for superimposing the masking noise signal over the objectionable artifact.

18. The system of claim 17 further comprising means for creating the masking noise signal in a digital signal processor (DSP) resident within the mobile telephone.

19. The system of claim 18 further comprising means for creating the masking noise in the digital signal processor (DSP) of the mobile telephone using a pseudo-noise generator.

20. The system of claim 18 further comprising means for storing the masking noise signal as a look-up table in the digital signal processor (DSP) of the mobile telephone.

21. The system of claim 17 further comprising means for filtering the masking noise signal to best match the objectionable artifact.

22. The system of claim 21 wherein filtering the masking noise signal to best match the objectionable artifact comprises means for low pass filtering the masking noise signal for objectionable artifacts that are lower in frequency.

23. The system of claim 21 wherein filtering the masking noise signal to best match the objectionable artifact comprises means for high pass filtering the masking noise signal for objectionable artifacts that are higher in frequency.

24. The system of claim 21 wherein filtering the masking noise signal to best match the objectionable artifact comprises means for band pass filtering the masking noise signal about the center frequency of the objectionable artifact.

25. The system of claim 17 wherein the masking noise signal is a band-limited masking noise signal created within a pre-determined frequency bandwidth correlated to the frequency bandwidth of the objectionable artifact.

26. The system of claim 25 wherein the band-limited masking noise signal is created in a digital signal processor (DSP) resident within the mobile telephone.

27. The system of claim 26 wherein the band-limited masking noise signal is created in the digital signal processor (DSP) of the mobile telephone using a pseudo-noise generator.

28. The system of claim 18 wherein the band-limited masking noise signal is stored as a look-up table in the digital signal processor (DSP) of the mobile telephone.

29. The system of claim 17 further comprising means for fading the masking noise out over time once the objectionable artifact ceases to be present to avoid the sudden removal of the masking signal.

30. The system of claim 17 wherein the masking noise signal is created by:
   generating a repetitive signal to drive a switching regulator wherein said regulator generates an objectionable artifact; and
   phase modulating the repetitive signal to generate the switching regulator's own masking noise signal.

* * * * *